United States Patent [19]

Zantinge

[11] Patent Number: 4,953,891
[45] Date of Patent: Sep. 4, 1990

[54] CONNECTING STRUCTURE FOR CONNECTING A SPRING AXLE SUSPENSION TO A VEHICLE CHASSIS

[75] Inventor: Johan M. Zantinge, Rheden, Netherlands

[73] Assignee: Wewler N.V., Apeldoorn, Netherlands

[21] Appl. No.: 294,164

[22] Filed: Jan. 6, 1989

[30] Foreign Application Priority Data

Jan. 7, 1988 [NL] Netherlands .................. 8800027

[51] Int. Cl.⁵ .................................................. B60G 7/02
[52] U.S. Cl. .................................. 280/788; 52/730; 280/713
[58] Field of Search ............. 280/788, 718, 711, 713, 280/725; 52/730; 403/354

[56] References Cited

U.S. PATENT DOCUMENTS

| | | | |
|---|---|---|---|
| 2,865,652 | 12/1958 | Easton | 280/713 |
| 2,920,903 | 1/1960 | Locker | 280/713 |
| 3,022,087 | 2/1962 | Black . | |
| 3,279,815 | 10/1966 | Hutchens . | |
| 3,902,734 | 9/1975 | Fier . | |
| 4,802,690 | 2/1989 | Raidel | 280/713 |

FOREIGN PATENT DOCUMENTS 1077992  3/1960  Fed. Rep. of Germany ...... 63 C/37

Primary Examiner—Charles A. Marmor
Assistant Examiner—Karin Tyson
Attorney, Agent, or Firm—Webb, Burden, Ziesenheim & Webb

[57] ABSTRACT

A connecting structure for connecting a spring axle suspension to a vehicle chassis, in which there is a better transmission of forces between this suspension and the chassis in that each spring axle suspension has a part which is rigid in all directions and which is welded to the underside of a chassis bar directly below an upstanding web thereof by a fastening part, which is narrow in the transverse direction to prevent warping of the chassis bars. Two opposite rigid suspension parts are connected by a rigid transverse connecting part. Said fastening part is preferably formed by two longitudinal narrow strips in line with each other, which strips may each form the web of a bar with transverse flanges which flanges terminate at a short distance below the chassis bar, to which said web is connected. There may be a bracing from an upstanding web of the chassis bar to the rigid transverse connection between the rigid parts of the axle suspension.

20 Claims, 2 Drawing Sheets

CONNECTING STRUCTURE FOR CONNECTING A SPRING AXLE SUSPENSION TO A VEHICLE CHASSIS

BACKGROUND OF THE INVENTION

The invention relates to a connecting structure for connecting a spring axle suspension to a vehicle chassis.

The spring carrier arms by means of which spring axles suspensions of vehicles are connected to the chassis have to be capable of transmitting great forces to the chassis. The vertical forces give rise to no major problems here, since they are primarily compressive forces for which the connection can easily be made strong enough. Horizontal forces and the moments resulting from them give rise to more problems. This applies in particular with air spring systems, particularly those in which, as is customary, air bellows are located on hinged arms which are connected only at the front by means of a spring carrier arm to the chassis. Such air bellows can absorb forces in only one direction, with normal positioning only vertical forces. All other reaction forces and moments must be transmitted via the spring carrier arms to the chassis. But even in the case of ordinary mechanical spring mechanisms, such as with leaf springs, problems of this nature occur. Additional facilities are therefore necessary to absorb these forces and moments, generally in the form of reinforcement sections on the chassis.

The object of the invention is then to provide a simple solution to this problem.

BRIEF SUMMARY OF THE INVENTION

To this end, a connecting structure of the type mentioned in the preamble is according to the invention characterized in that the spring axle suspension engages with a part which is rigid in the transverse and lengthwise direction of the vehicle, and which is fastened underneath to a chassis bar running in the lengthwise direction of the vehicle, with a much narrower fastening part in the transverse direction of the vehicle, also much narrower than said chassis bar, while two opposite rigid parts with which said axle suspension engages are connected by a transverse connection to form a rigid unit.

In this way only vertical and horizontal reaction forces are passed on to the chassis. Moments due to transverse forces are absorbed by the rigid unit, formed by the transverse connection, and they thus do not place any strain on the narrow fastening parts.

Use of the invention permits not only a simple and light structure, but also achieves other advantages. No additional transverse bars need be fitted at the spring carrier arms in the chassis, which means that the chassis can be kept a standard design, and simple fitting is possible. This also gives more freedom in accommodating the load partially between the chassis bars, which is a great advantage, for example for carrying tanks and transporting boats. The narrow fastening parts can be fastened at the most advantageous point of the chassis bars, viewed in the transverse direction, thus direct below the area of vertical webs of said bars, which in the case of an I-section design is therefore in the transverse centre, which with welding gives fewer problems than welding against a slack part of a horizontal flange of those bars. The force transmission to the chassis is thus more direct and is better to avoid deformation of the chassis bars. Moreover, welding to the chassis is kept to a minimum.

Deformations resulting from the torsionally weak chassis unchanged in the lengthwise direction can be absorbed smoothly.

The narrow fastening parts are preferably designed as longitudinal strips which at the front and rear end along the bottom of their chassis bar end in parts of low height and with a free bottom side and have a smooth transition downwards into the above-mentioned rigid part of the structure. This produces gradually increasing rigidity in the lengthwise direction, and thus a gradual build-up of tension.

In particular, the possibility of leaving out additional transverse bars and using such a gradual build-up of tension mean that this connecting structure is very suitable for use in vehicle chassis made of light metal, in which the absence of cross welds has a favourable effect on the service life. Thus, the present invention discloses a connecting structure adapted to be connected to a vehicle chassis, for connecting a spring axle suspension to a vehicle chassis, characterized in that the spring axle suspension engages with a part which is rigid in the transverse and lengthwise direction of the vehicle, and which is fastened underneath to a chassis bar running in the lengthwise direction of the vehicle, with a longitudinal strip; said longitudinal strip forming a much narrower fastening part in the transverse direction of the vehicle, also much narrower than said chassis bar, while two opposite rigid parts with which said axle suspension engages are connected by a transverse connection to form a rigid unit.

The present invention discloses a connecting structure for connecting a spring axle suspension to a vehicle chassis comprising:
  a pair of spaced bracket assemblies, said bracket assemblies including at a first end a means for retaining said spring axle suspension between said spaced bracket assemblies, said bracket assemblies forming an upward extending rigid assembly at a second end opposite said first end;
  a pair of upright bars rigidly connected at a first end to said upward-extending rigid assembly, said upright bars extending from said upward extending rigid assembly in an upward direction away from said bracket assemblies, each of said upright bars terminating at a second end and forming a strip, said strips being adapted to be fastened to the underside of a vehicle chassis bar, said vehicle chassis bar running in the lengthwise direction of a vehicle, said strips having a much narrower transverse width than the transverse width of said chassis bar to which said strip is adapted to be attached;
  said connecting structure being characterized by being rigid in the transverse and lengthwise direction of said vehicle chassis bar to which it is adapted to be attached.

BRIEF DESCRIPTION OF THE DRAWINGS

The invention will now be explained in greater detail with reference to the appending drawing, also as regards advantageous detail embodiments, in which.

DETAILED DESCRIPTION OF THE PREFERRED EMBODIMENTS

Figure 1:
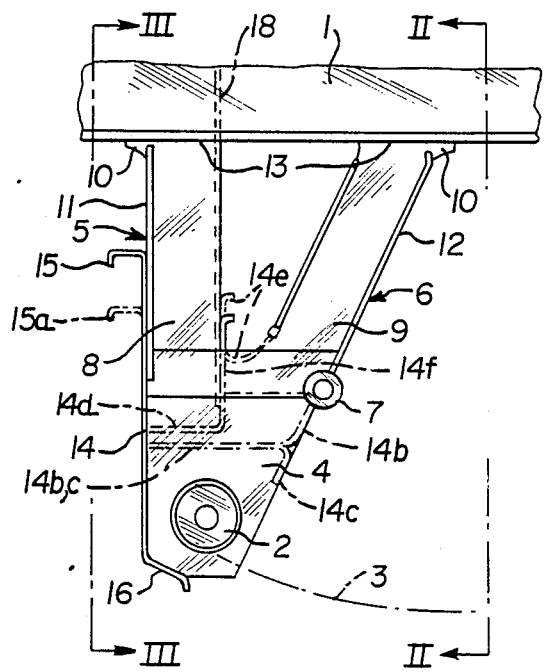
FIG. 1 is a side view of a connecting structure according to the invention, in a preferred embodiment.

A spring carrier arm (spring Hanger) is fastened by means of a structure according to the invention to longitudinal chassis bars 1 of a vehicle. In forming a typical vehicle frame two spaced longitudinal chassis bars are typically connected by two or more transverse crossmember bars at a point near the front of the vehicle frame and at a point near the back of the vehicle frame, front meaning the forward section of the vehicle frame with respect to its usual direction of forward movement. The longitudinal chassis bars may take many forms including but not limited to a box or channel design (or section), an I-section, a T-section, an inverted T-section, a U-section, an L-section or an H-section. In order to illustrate the present invention, the chassis bars are here designed as I-section bars. The spring carrier arm comprises in the usual manner a steel bush (not shown) with a rubber bush around it, which is gripped by a leaf spring or hinged arm for carrying an air bellows or other spring structure. The bush is fitted on a steel pin, which is fixed in two opposite bracket parts 2 (FIG. 2). Dot- and dash-line 3 shows schematically a part of such a spring or arm in FIG. 1. The structure according to the invention can also be used for all other possible fastenings of spring axle suspensions, such as leaf spring fastenings to spring shackles or in laterally locking sliding connections, as known per se. The bracket parts 2 form part of an upward-extending rigid part, comprising a box 4 directly above the spring carrier arm, passing upwards into and rigidly connected to two upright bars 5 and 6 each of said upright bars forming an I- or T-section. A possible hinge engagement bush for a shock absorber is indicated by 7, and is welded to the box 4.

The bars 5 and 6 are preferably welded together from individual metal sheets for forming web and flanges. This makes it possible to make the flanges end smoothly if desired at the top and bottom and make the web broader locally, which is of great practical benefit for the invention, as will be described now. These possibilities are clear from FIG. 1.

The web 8 of bar 5 and the web 9 of bar 6 have at the top end a broadened part 10 at one end, projecting beyond the adjacent flanges 11 of bar 5 and 12 of bar 6, projecting freely at their lower edge and increasing in height in a smooth curve towards the part between the flanges. Said webs can be passed locally through slots in the flanges 11 and 12, as shown, and welded therein.

Figure 2:
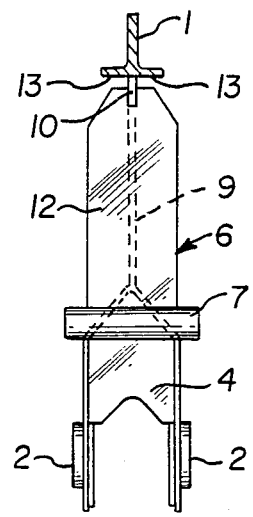
FIG. 2 is a cross section along the line II—II in FIG. 1.

The webs formed in this manner thus form strips, also known as longitudinal strips, defined as follows and as shown in FIG. 1. The strips are formed by the top ends of webs 8 and 9, said strips extending beyond flanges 11 and 12 at the top of webs 8 and 9 and including broadened part 10. The strips extend lengthwise in the direction of chassis bars 1 and function as much narrower fastening portions (much narrower with respect to chassis bar 1) for fastening the spring carrier arm (also known as a spring hanger or connecting structure) to chassis bar 1. The webs 8 and 9 and their corresponding strips are fully illustrated in FIG. 1.

All transverse flanges on the bars 5 and 6 end a short distance below the bottom face of chassis bar 1, as shown. The webs 8 and 9 are welded along their top edges along both sides at 13 to the transverse centre of the chassis bar, directly below the vertical web thereof.

A transverse connecting plate 14 is welded to the two thus designed opposite structures, in order to form a rigid entity therewith, and has at the top and bottom end a flanged part 15, 16 respectively for reinforcement.

The connecting plate 14 can easily be adapted to variations in the vertical distance between the bracket parts 2 and the chassis bars in height, shape and strength and it may have many different shapes and dimensions. E.g., if a shorter or longer distance between the brackets 2 and the chassis bar 1 than that depicted in FIG. 1, is desired or required in a given application of the present invention, plate 14 may be alternatively made shorter or longer with respect to the distance between flanged part 15 and flanged part 16 (a shorter connecting plate 14 is depicted by the distance between flanged part 15a and flanged part 16 as illustrated in FIG. 1, which is shown as terminating in FIG. 1 in upper flange 15a. Where connecting plate 14 is shorter than that depicted in FIG. 1, flanged part 15a, when mounted in the position occupied by flanged part 15, will cause the distance between brackets 2 and the chassis bar 1 to be smaller. The reverse is true where connecting plate 14 is longer than that depicted in FIG. 1. In dot- and dash-lines other possible shapes of this plate 14 are shown and these are indicated by 14b, 14c, 14d, 14e and 14f, but other shapes and combinations thereof are also possible. In these examples it is assumed that these shapes 14b and 14f inclusive are combined with the lower part of the plate 14 shown in full lines and with the lower flanged part 16 thereof.

Through this design, only vertical and horizontal forces are passed on to the chassis bar 1. Vertical forces arise, inter alia, through gravity, load, uneven road surfaces and travelling round bends, and they are transmitted well to said chassis bars by the bodies 8 and 9 of the bars 5 and 6. Horizontal forces in the lengthwise direction arise through driving, accelerating and braking, and can be great particularly during braking. They are transmitted well through the relatively long welds 13. Horizontal forces in the transverse direction are also transmitted well between chassis and spring carrier arm by these welds.

Moments in vertical longitudinal planes, caused in particular as braking torque, are transmitted only as vertical tensile and compressive forces by the stripes, formed by the top ends of the webs 8 and 9 of bars 5 and 6, and the welds 13.

Moments in vertical transverse planes, arising through transverse forces relative to the chassis are in many cases absorbed sufficiently by the transverse connecting plate 14 and are not passed on to the chassis.

Moments in horizontal planes, arising through transverse forces, are not transmitted to a substantial degree to the spring carrier arms if there is a good design of the axle body fastening with carrier arms and/or possibly leaf springs.

Figure 3:
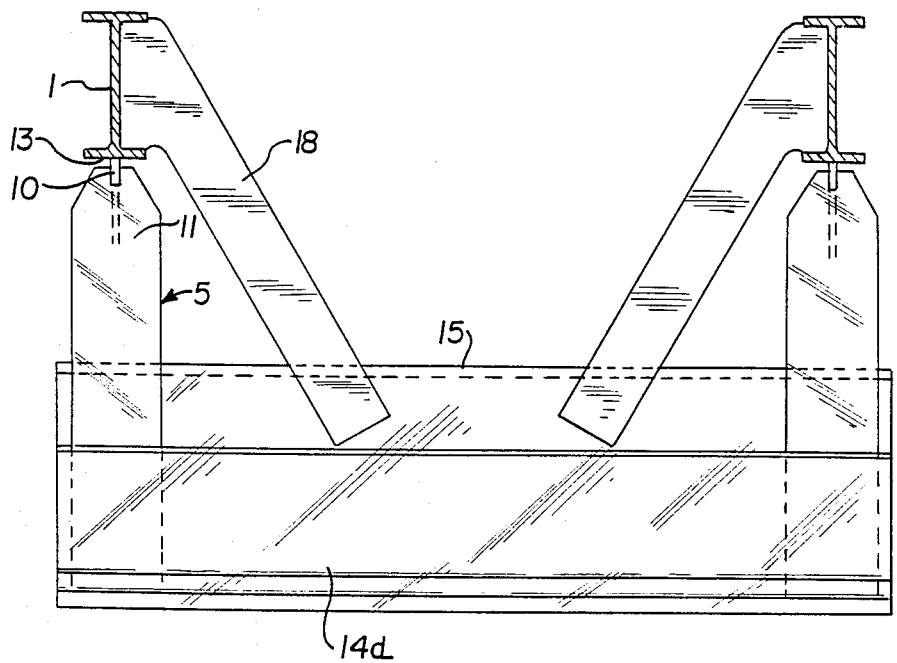
FIG. 3 is a view of the structure according to arrow III in FIG. 1 in two different embodiments shown at left and right.
Figure 4:
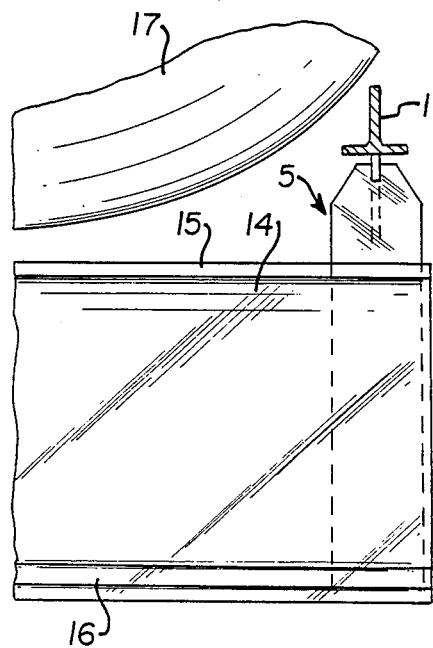
FIG. 4 is a view of the structure according to arrow III in FIG. 1 showing the right half of one embodiment of the present invention.

This design means that usually no additional transverse strengthening bars are required between the chassis bar 1, so that, for example a tank (FIG. 3), a boat or the like can be accommodated in a low position relative to the chassis, fixed or for loose transportation. In many cases there is, however, the risk that transverse forces deform the chassis bars 1 too much. If the tank 17 is fixed sufficiently rigidly between the chassis bars 1, this will usually not be a problem. If a tank, boat or other load does not connect the chassis bars 1 in a sufficiently rigid manner, e.g. in loose transportation, and if the structure described would also in other respects be such as to deform the upstanding webs of the chassis bars 1 too much by transverse forces, e.g. by warping these webs, there may be a bracing like 18 as shown in the left-hand part of FIG. 3, each to connect said upstanding web of a chassis bar 1 to connecting plate 14 by welding. This is shown here for an embodiment of plate 14 according to possibility 14d of FIG. 1, as it allows a plate 14 of much smaller height than shown in full lines in FIG. 1 to be used adequately. It also means that transverse strengthening bars between the chassis bars can be more easily be dispensed with. These bars 18 may be flat strips lying e.g. in the same transverse plane as the right-hand part of bars 5 as seen and shown in FIG. 1, but they may have transverse flanges.

The structure described makes it easy to vary the height of the spring carrier arms relative to the chassis, while keeping the main shape of the structure the same and adapting the strength. This is easy to achieve by always making the boxes 4 the same shape and varying the length of the upright bars 5 and 6. With spring carrier arms higher up and thus shorter bars 5 and 6, the connection points thereof on the chassis bar in the lengthwise direction thereof are closer together, which is a reliable design feature, since the moments in longitudinal planes of the chassis are smaller when the spring carrier arms are higher up, due to the shorter lever arm.

Transverse distance variations between the chassis bars 1 between different vehicles require no change in the structure described, except that the transverse connecting plate 14 has to be adapted in length.

If the chassis bars 1 have another shape, the zone where the webs 8 and 9 are welded to them may be varied transversely so as to have them with the welds 13 always positioned directly below a vertical web part of the chassis bars, which always gives a very good transmission of vertical forces, whether there are bracings like 18 or not.

The invention may of course be embodied in many different ways. E.g. box-like parts like box 4 or parts welded on top thereof like beams 8 and 9 may have two opposite walls parallel to the plane of FIG. 1 and perpendicular to the plane of FIGS. 2 and 3 at a distance from each other extending upwardly to the chassis bars 1, but molded so that near the chassis bars they approach each other and at the chassis bars they come into contact with each other along their length to form the narrow fastening part to the chassis, welded thereto as a double strip.

It is also possible not to have a separate box at each side like box 4, but to give the connecting plate 14 the shape of a closed or substantially closed hollow beam about as indicated by 14c in FIG. 1, but with the horizontal top web about at the height of the top of box 4 in FIGS. 1 and 2 and, if necessary, open parts to allow free passage and sufficient freedom of movement to leaf spring or arm 3, so that no separate box 4 is necessary. Bars like 5 and 6 are then welded directly to the top web of such a beam. It is also possible to make the lower edge of such a hollow beam extend above the bracket parts 2, which are then welded to the lower web of such a beam. Although in such cases no separate box 4 is required, the hollow beam may have walls perpendicular to its length and welded therein to replace the corresponding walls of the box 4, at any desired position along the length of the beam.

Having described the invention in detail and by reference to preferred embodiments thereof, it will be apparent that modifications and variations are possible without departing from the scope of the invention defined in the appended claims.

What is claimed is:

1. Connecting structure adapted to be connected to a vehicle chassis, for connecting a spring axle suspension to a vehicle chassis, characterized in that the spring axle suspension engages with a part which is rigid in the transverse and lengthwise direction of the vehicle, and which is fastened underneath to a chassis bar running in the lengthwise direction of the vehicle, with a longitudinal strip; said longitudinal strip forming a much narrower fastening part in the transverse direction of the vehicle, also much narrower than said chassis bar, while two opposite rigid parts with which said axle suspension engages are connected by a transverse connection to form a rigid unit.

2. Structure according to claim 1, in which said narrow fastening part is a longitudinal strip running in the lengthwise direction of the chassis bar.

3. Structure according to claim 2, in which said strip is adapted to be connected to the underside of a chassis bar directly below a vertical web of said chassis bar.

4. Structure according to claim 2 or 3, in which two such longitudinal strips are provided in line with each other in the lengthwise direction and are spaced apart.

5. Structure according to claim 4, in which two opposite bracket parts includes a means for attaching said axle suspension to said connecting structure, said tow opposite bracket parts forming a rigid part of said connecting structure from the point of engagement of said axle suspension on said rigid parts of said connecting structure, said rigid part forming a box-shaped part, said box-shaped part being rigidly connected to two upright bars, at a point opposite said bracket parts, said upright rails being rigid in the transverse direction and diverge upwards towards said two longitudinal strip connections.

6. Structure according to claim 5, in which said upright bars are T- or I-sections, the web of which projects upwardly beyond the T- or I-shaped parts to form said longitudinal strips.

7. Structure according to claim 1, in which said longitudinal strips are formed in a part which is small in height and has a free bottom edge, and which passes in a smooth transition from the point where said longitudinal strip is adapted to be attached to said chassis bar to the point where said longitudinal strip is connected with the above-mentioned rigid part of the structure.

8. Structure according to claim 1 in which the transverse connection is an upright plate with top and/or bottom edge bent out of its plane, and which is welded at each side of the chassis to one of said rigid parts of the connecting structure wherein said rigid part includes two opposite bracket parts, said bracket parts including a means for attaching said axle suspension to said connecting structure, and wherein said upright plate further comprising a downward extension which extends beyond said two opposite bracket parts and is welded to said two opposite bracket parts.

9. Structure according to claim 1 in which in the area of said strips the chassis is free from transverse connecting bars or other means for connecting the two opposite chassis bars to each other.

10. Structure according to claim 9, in which a bracing bar is adapted to be connected to and extends from an upstanding web of said chassis bar and extends to and is connected to the transverse connection between the said two opposite rigid parts, said bracing bar being inclined from the point of connection to said chassis bar to the point of connection with said transverse connection and being secured as by welding to said chassis bar and to said transverse connection.

11. A connecting structure for connecting a spring axle suspension to a vehicle chassis comprising:
   a pair of spaced bracket assemblies, said bracket assemblies including at a first end a means for retaining said spring axle suspension between said spaced bracket assemblies, said bracket assemblies forming an upward extending rigid assembly at a second end opposite said first end;
   a pair of upright bars rigidly connected at a first end to said upward-extending rigid assembly said upright bars extending from said upward extending rigid assembly in an upward direction away from said bracket assemblies, each of said upright bars terminating at a second end and forming a strip, said strips being adapted to be fastened to the underside of a vehicle chassis bar, said vehicle chassis bar running in the lengthwise direction of a vehicle, said strips having a much narrower transverse width than the transverse width of said chassis bar to which said strip is adapted to be attached;
   said connecting structure being characterized by being rigid in the transverse and lengthwise direction of said vehicle chassis bar to which it is adapted to be attached.

12. The structure according to claim 11 in which said strips are connected to the underside of said chassis bar at a point directly below a vertical web of said chassis bar.

13. The structure according to claim 11, in which said strips are provided in line with each other in the lengthwise direction and are spaced apart in the transverse direction.

14. The structure according to claim 11, in which said upward-extending rigid assembly comprises a box-shaped part said box-shaped part having a first end rigidly connected to said bracket assemblies directly above said spring axle retaining means and a second end opposite said first end, said second end rigidly connected to said pair of upright bars, said pair of upright bars being rigid in the transverse direction and diverging from each other in the direction away from said spring axle retaining means, said pair of upright bars terminating with said strips.

15. The structure according to claim 1 in which said upright bars are T- or I-sections, the web of which projects upwardly beyond the T- or I-shaped parts to form said strips.

16. The structure according to claim 11, in which each of said strips is formed with a broadened portion extending in a lengthwise direction longitudinally along said vehicle chassis bar, said broadened portion of each of said strips passing in a smooth transition from the most longitudinal point of said broadened portion of said strip to its point of junction with said upright bar, said broadened portion extending in a forward direction for the most forward strip and said broadened portion extending rearward for the most rearward strip, said broadened portion for either strip being characterized by being formed without flanged edges.

17. The structure according to claim 11, which further comprises a transverse connecting plate, said transverse connecting plate being rigidly attached at a first end to the first of a pair of connecting structures, said transverse connecting plate extending transversely in a direction corresponding to a direction across a vehicle chassis frame to and being rigidly attached at a second end to a second connecting structure, each of said connecting structures being adapted to be connected to each of two opposite vehicle chassis bars, wherein said transverse connecting plate is an upright plate having a top and/or bottom edge bent out of its plane.

18. The structure according to claim 17, further comprising:
   one or more bracing bars each of said bracing bars having a first end which is adapted to be rigidly attached to a vertical web of said chassis bar and a second end rigidly attached to said transverse connecting plate;
   wherein said bracing bar is inclined from said point of attachment to said chassis bar to said point of attachment to said transverse connecting plate.

19. The structure according to claim 17, wherein said transverse connecting plate is attached to each of said connecting structures to each of said spaced bracket assemblies, and wherein said transverse connecting plate extends beyond said spaced bracket assemblies in a direction away from said strips, said transverse connecting plate terminating with its top and bottom edges bent out of their planes to form a flanged part on each of said top and bottom edges.

20. The structure according to claim 17, which is characterized by the absence of chassis frame crossmember bars connecting said two opposite vehicle chassis bars to each other in the area of said strips.

* * * * *

UNITED STATES PATENT AND TRADEMARK OFFICE
CERTIFICATE OF CORRECTION

PATENT NO. : 4,953,891
DATED : September 4, 1990
INVENTOR(S) : Johan M. Zantinge It is certified that error appears in the above-identified patent and that said Letters Patent is hereby corrected as shown below:

Column 3 Lines 2-3 please insert a period after the numeral "1" and delete "in two different embodiments, shown at left and right."

Column 3 Line 10 "Hanger" should read --hanger--.

Column 4 Line 50 "stripes" should read --strips--.

Claim 5 Line 33 Column 6 "tow" should read --two--.

Signed and Sealed this

Twenty-eighth Day of January, 1992

Attest:

HARRY F. MANBECK, JR.

*Attesting Officer*  *Commissioner of Patents and Trademarks*